Jan. 15, 1929.  1,699,399
J. S. LACH
AUTOMOBILE LOCK MEANS
Filed Aug. 4, 1926   3 Sheets-Sheet 1
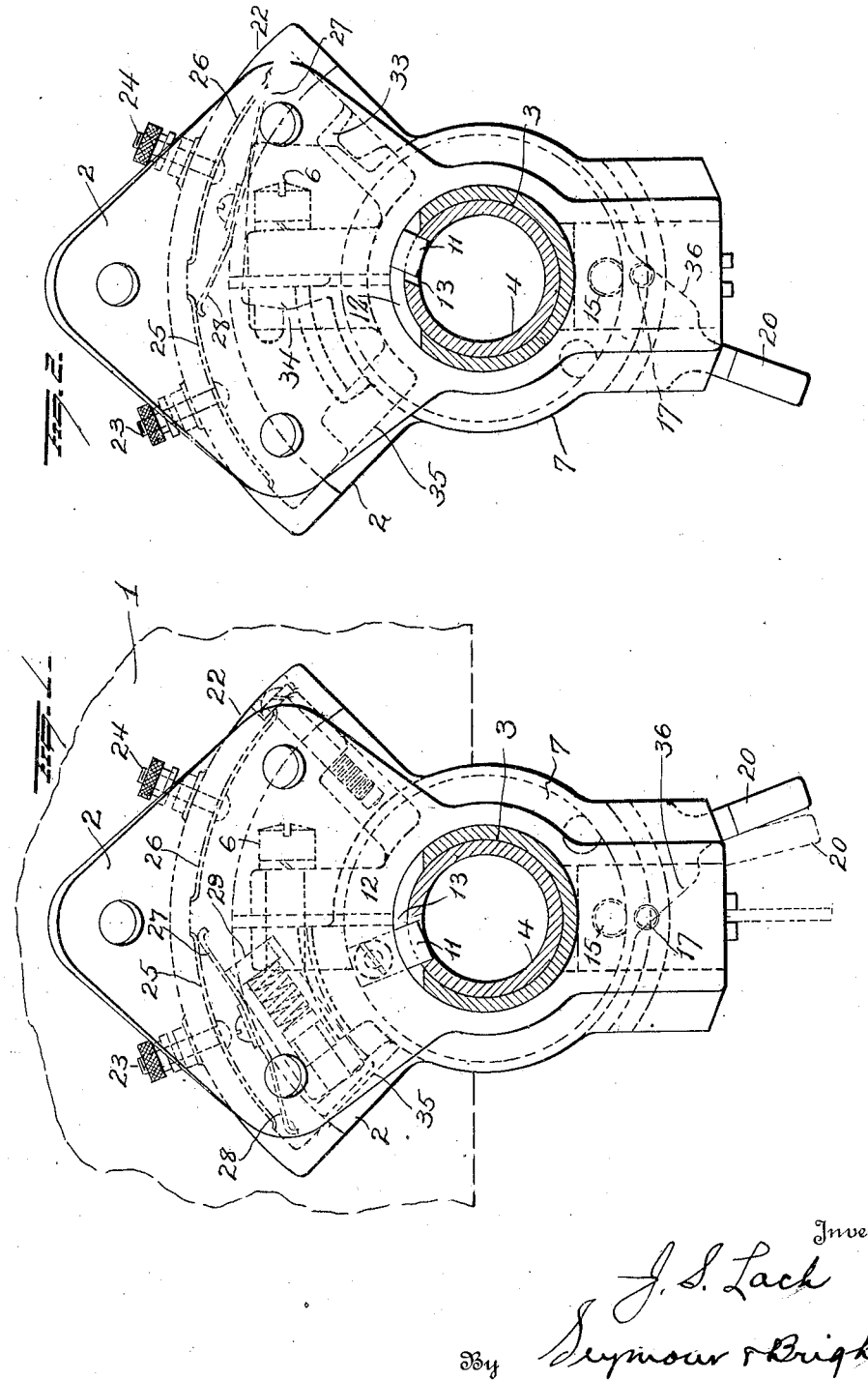

Jan. 15, 1929.
J. S. LACH
1,699,399
AUTOMOBILE LOCK MEANS
Filed Aug. 4, 1926    3 Sheets-Sheet 2
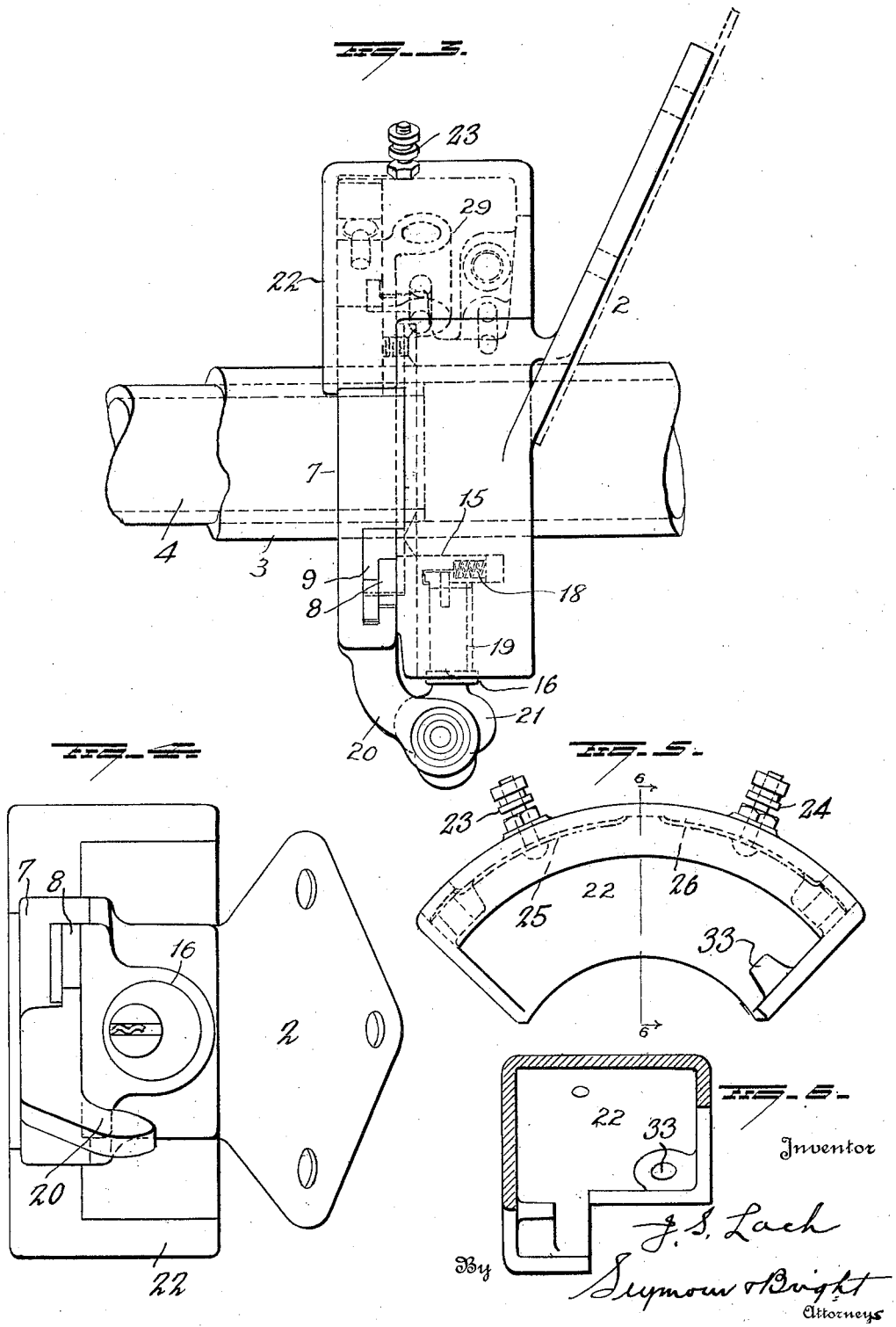

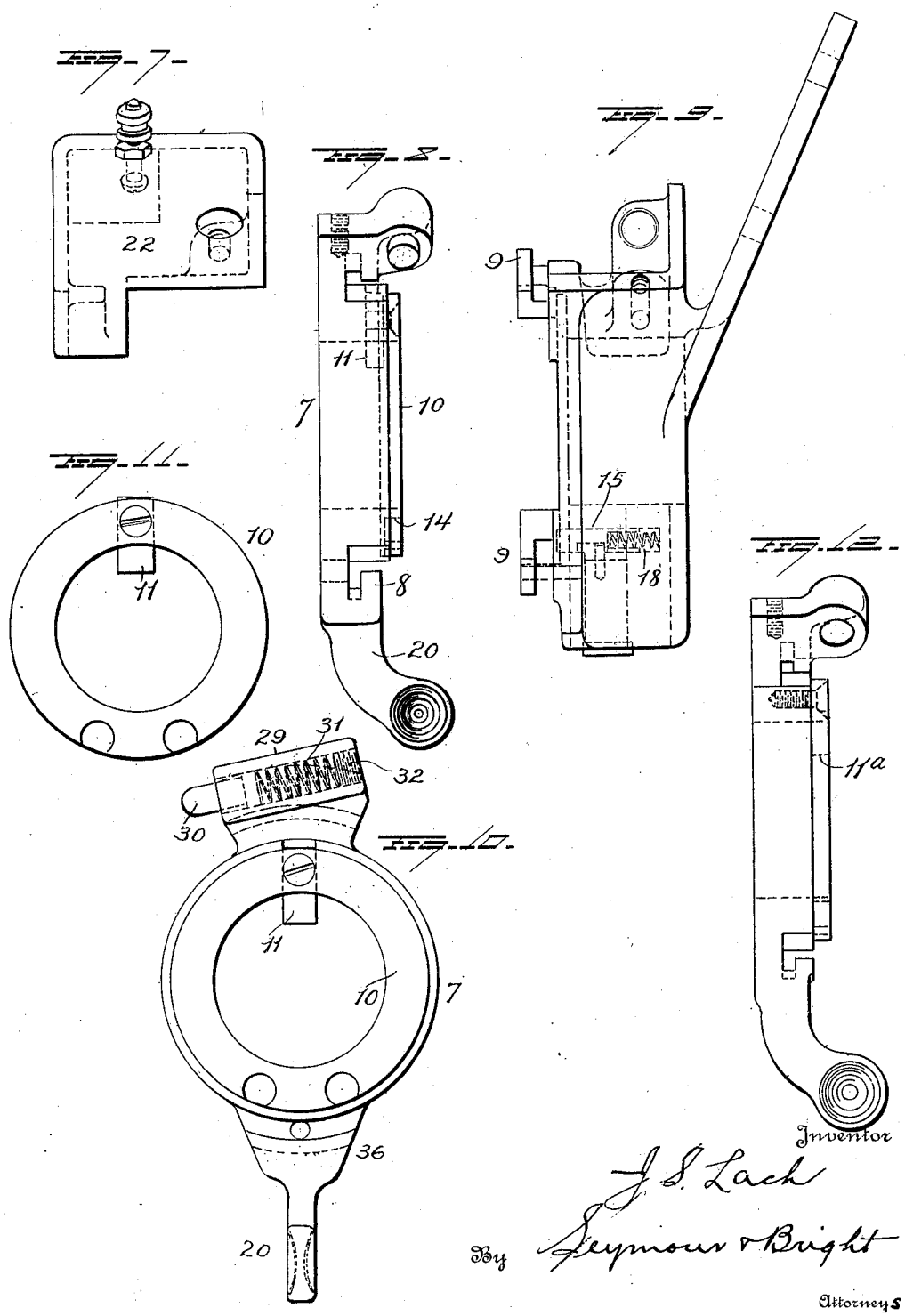

Patented Jan. 15, 1929.

1,699,399

UNITED STATES PATENT OFFICE.

JOSEPH S. LACH, OF BRIDGEPORT, CONNECTICUT, ASSIGNOR TO THE YALE & TOWNE MANUFACTURING COMPANY, OF STAMFORD, CONNECTICUT.

AUTOMOBILE LOCK MEANS.

Application filed August 4, 1926. Serial No. 127,087.

This invention relates to locking means for automobiles,—one object of the invention being to provide simple and efficient means associated with the steering column of an automobile for opening the ignition circuit and locking it open and at the same time operate an actuating member housed in the steering column and operable to effect the locking of another element of the control means, as the clutch operating means.

A further object is to provide locking means including a key-controlled lock, which shall be so constructed that said locking means cannot be fully operated to locking position until the key shall have been removed from the key-controlled lock, thus preventing the key from being inadvertently left in the lock when the control elements of the automobile shall have been locked and rendered inoperative.

With these and other objects in view, the invention consists in certain novel features of construction and combinations of parts as hereinafter set forth and pointed out in the claims.

In the accompanying drawings,—

Figure 1 is a view partly in section showing an embodiment of my improvements with the parts in locking positions.

Figure 2 is a similar view showing the parts in normal or unlocked position.

Figure 3 is a view in side elevation.

Figure 4 is a front view.

Figure 5 is a view of the circuit breaker housing.

Figure 6 is a view in section on the line 6—6 of Figure 5.

Figure 7 is an end view of the circuit breaker housing.

Figure 8 is a side view of the operating yoke.

Figure 9 is a view of the steering column bracket.

Figure 10 is a face view of the operating yoke.

Figure 11 is a separate view of the locking collar or ring, and

Figure 12 is a side view showing a modification of the operating yoke.

In Figure 1 of the drawings, a portion of the instrument board of an automobile is indicated at 1 and to this board is secured a bracket 2 which encircles the steering column 3. The bracket 2 is thus mounted on the steering column and secured to the instrument board. An actuating member 4 is rotatably mounted in and protected by the steering column 3. This actuating member is intended to control locking means for the clutch shaft and pedal of an automobile as fully shown and described in copending application Serial No. 127,111, filed simultaneously herewith by K. A. Brauning. In order that the bracket 2 shall be firmly clamped to the steering column 3, said bracket is provided with lugs 5 through which a bolt 6 is passed.

Adjacent to the bracket 2, an operating yoke 7 is mounted to turn and is connected with the bracket through the medium of tongue and groove connections. That is to say the yoke is provided with hook portions or tongues 8 to receive hook portions or tongues 9 on the bracket. The tongues 8 and 9 are cut away to permit the assembling of the parts and after the yoke shall have been applied to the bracket, it will be turned sufficiently to effect an interlocking connection with said bracket. The yoke 7 is provided with a locking ring or collar 10 suitably secured thereto and to this ring or collar a depending finger 11 is secured. This finger passes through a slot 12 in the steering column 3 and enters a hole 13 in the actuating member 4,—said hole 13 being of greater diameter than the width of the finger 11 so that the latter may have a limited movement without moving the actuating member 4. The locking ring 10 is provided with sockets or recesses 14 to receive a bolt 15 of a cylinder lock structure 16 mounted in the bracket 2 and secured therein by means of a set screw 17 as shown in Figure 1. This bolt is projected by means of a spring 18 but may be retracted by the operation of the plug 19 of the lock. The operating yoke 7 is provided with a handle portion 20 which is movable in the path occupied by the head of the key 21 when the latter is in the plug of the lock. The key 21 will therefore prevent the operating yoke 7 to be moved far enough to turn the actuating member 4 and release the clutch shaft and pedal locking means. Before the operating yoke can be fully operated for the purpose stated, the key 21 must be removed from the lock and hence there would be no danger of the key being inadvertently left in the lock after the device shall have been locked.

Secured to the bracket 2 is a circuit breaker housing 22 which is made of bakelite or other suitable non-conducting material. Binding posts 23—24 are secured to the housing 22 and have electrically connected with their inner ends, contact strips 25 and 26 respectively, located within the housing and electrically separated from each other. Contact fingers 27—28 (preferably made in a single piece of spring metal) are carried by the operating yoke 7 and are adapted, under normal conditions to electrically connect the contact strips 25 and 26 and thus effect the continuity of the ignition circuit,—such position of the circuit breaker formed by the contact strips 25 and 26 and the contact fingers 27—28 being indicated in Figure 2 of the drawing.

The operating yoke 7 carries a tubular enlargement 29 for the accommodation of a plunger 30 and a spring 31 for said spring plunger, the rear end of said spring bearing against a plug 32 in the tubular enlargement. When the operating yoke is in locked position as shown in Figure 1, the plunger 30 will be in contact with one end wall of the housing 22 and the spring 31 will be compressed. When the bolt 15 of the cylinder lock is retracted to release the operating yoke, the latter will be moved by the operation of the spring pressed plunger 30 a sufficient distance to permit the contact finger 27 to engage the contact strip 26 and the contact finger 28 to engage the contact strip 25, thus closing the ignition circuit, the extent of movement of the operating yoke being indicated by the dotted position of the handle 20 of said yoke in Figure 1 of the drawings. The automatic movement of the operating yoke as above described will be limited by the engagement of the finger 11 with one end wall of the hole 13 in the actuating member 4. After the key 21 shall have been removed from the cylinder lock, the operating yoke may be moved to the end of its throw to turn the actuating member 4 and effect the unlocking of the clutch shaft and pedal lever. Such movement of the operating yoke will be limited by a stop 33 on the circuit breaker housing 22. When the operating yoke is moved to locking position, it will be limited by the engagement of a stop 34 thereon with the bracket 2 at 35.

It will be observed that the handle 20 of the operating yoke is provided with a flanged or widened portion 36 which is of sufficient width to be disposed over and protect the screw 17 which fastens the cylinder lock in place, at all times during the movements of said operating yoke.

Should it be desired to make the operating yoke 7 of malleable iron, the ring 10 may be omitted and the finger 11$^a$ secured directly to the yoke as indicated in Figure 12.

Having fully described my invention what I claim as new and desire to secure by Letters Patent, is:

1. In automobile lock means, the combination of a bracket adapted to be secured to the instrument board and embrace the steering column of an automobile, an operating yoke to embrace the steering column and movably connected with said bracket, a housing secured to said bracket, contacts carried by said housing, contact means carried by the operating yoke and cooperable with said contacts, said contacts and contact means constituting a circuit breaker for the ignition circuit, and key-controlled lock means carried by the bracket to lock said yoke with the circuit breaker open.

2. In automobile lock means, the combination of a bracket adapted to be secured to the instrument board and embrace the steering column of an automobile, an operating yoke to embrace the steering column and movably connected with said bracket, a housing secured to said bracket, contacts carried by said housing, contact means carried by the operating yoke and cooperable with said contacts, said contacts and contact means constituting a circuit breaker for the ignition circuit, key-controlled lock means carried by the bracket to lock said yoke with the circuit breaker open, and means operable automatically to close the circuit breaker when the operating yoke is unlocked.

3. In automobile lock means, the combination of a bracket adapted to be secured to the instrument board and embrace the steering column of an automobile, an operating yoke to embrace the steering column and movably connected with said bracket, a housing secured to said bracket, contacts carried by said housing, contact means carried by the operating yoke and cooperable with said contacts, said contacts and contact means constituting a circuit breaker for the ignition circuit, key-controlled lock means carried by the bracket to lock said yoke with the circuit breaker open, a plunger carried by the operating yoke and pressed against a wall of the bracket, and a spring expanding between the plunger and the yoke to move the operating yoke and effect the automatic closing of the circuit breaker when said operating yoke is unlocked.

4. In automobile lock means, the combination of a bracket adapted to be secured to the instrument board and embrace the steering column of an automobile, an operating yoke to embrace the steering column and movably connected with said bracket, a housing secured to said bracket, contacts carried by said housing, contact means carried by the operating yoke and cooperable with said contacts, said contacts and contact means constituting a circuit breaker for the ignition circuit, key-controlled lock means carried by the bracket to lock said yoke with the circuit breaker open, means operable automatically to move the yoke and close the circuit breaker when the operating yoke is unlocked, and means for limiting the automatic closing movement.

5. In automobile lock means, the combination of a bracket adapted to be secured to the instrument board and embrace the steering column of an automobile, an operating yoke to embrace the steering column and movably connected with said bracket, a housing secured to said bracket, contacts carried by said housing, contact means carried by the operating yoke and cooperable with said contacts, said contacts and contact means constituting a circuit breaker for the ignition circuit, key-controlled lock means carried by the bracket to lock said yoke with the circuit breaker open, means operable automatically to close the circuit breaker when the operating yoke is unlocked, an actuating member rotatably mounted concentric with the yoke, and a lost-motion connection between the yoke and the actuating member whereby the latter may be turned by the yoke after the circuit breaker has closed.

6. In automobile lock means, the combination with an actuator, and a bracket adapted for association with the automobile steering column, of an operating yoke mounted for rocking movement on said bracket for setting the actuator in inoperative or operative condition, a key-controlled lock mounted in said bracket, fastening means for said lock, said lock including a bolt to engage the operating yoke and thereby lock the actuator in set position, and a handle on said operating yoke disposed over said fastening means of said lock.

7. In automobile lock means, the combination of a fixed support, a yoke mounted on the support for rocking movement, a circuit-closer comprising spaced contacts on the support and a contact carried by the yoke to bridge said spaced contacts, and a key-controlled lock secured in the support and including a bolt arranged to engage and lock the yoke when the circuit-closer is open.

8. In automobile lock means, the combination of a fixed support, an oscillatory yoke mounted thereon, a circuit-closer including spaced contacts on the fixed support and a contact carried by the yoke to bridge the spaced contacts, an actuating member rotatably mounted concentrically with the yoke and having an opening in its side, a tongue carried by the yoke and having lost-motion engagement in the opening in the actuating member, and a key-controlled means in the fixed support to engage the yoke and lock the circuit-closer and the actuating member in inoperative position.

In testimony whereof, I have signed this specification.

JOSEPH S. LACH.